United States Patent [19]

Schmidt et al.

[11] 4,414,186

[45] Nov. 8, 1983

[54] METHOD AND APPARATUS FOR CALCINING LIMESTONE IN A SHAFT KILN

[75] Inventors: Martin Schmidt; Walter Köhler; Hans-Ulrich Loch, all of Bochum; Albrecht Weber, Ratingen, all of Fed. Rep. of Germany

[73] Assignee: Klöckner-Humboldt-Deutz AG, Fed. Rep. of Germany

[21] Appl. No.: 370,833

[22] Filed: Apr. 22, 1982

[30] Foreign Application Priority Data

Apr. 29, 1981 [DE] Fed. Rep. of Germany ....... 3116986

[51] Int. Cl.³ .................. C01F 11/06; C01B 13/14; F27B 3/22
[52] U.S. Cl. .................................. 423/175; 423/637; 432/22; 432/96
[58] Field of Search ............... 423/168, 170, 171, 172, 423/185, 555, 642, 636, 637, 173, 175–177; 432/22, 24, 25, 96, 99, 102; 106/87, 109, 110, 111; 110/104 R, 106

[56] References Cited

U.S. PATENT DOCUMENTS

| 2,933,297 | 4/1960 | Erasmus et al. | 432/99 |
| 3,941,557 | 3/1976 | Buchner | 432/99 |
| 3,969,068 | 7/1976 | Miller et al. | 432/22 |
| 4,031,183 | 6/1977 | Rourke | 423/175 |
| 4,131,072 | 12/1978 | Lingl, Jr. et al. | 110/106 |
| 4,141,154 | 2/1979 | Buchner | 432/26 |
| 4,250,816 | 2/1981 | Angevine et al. | 110/104 R |
| 4,287,160 | 9/1981 | von Zander | 432/99 |
| 4,313,386 | 2/1982 | Boldt et al. | 110/104 R |
| 4,315,735 | 2/1982 | Fussel et al. | 423/637 |

Primary Examiner—Gary P. Straub
Attorney, Agent, or Firm—Hill, Van Steadman & Simpson

[57] ABSTRACT

A method and apparatus for calcining minerals, particularly limestone, in a shaft kiln having at least two vertically spaced levels including cooled hollow supports through which a solid fuel is introduced into the kiln. One feature of the present invention resides in employing a granular coal as the fuel while other features are involved with the distribution of fuel between various inlet points, suspension of the fuel in an airstream, and the mechanical construction of the fuel conduits and their support located within the shaft kiln.

9 Claims, 12 Drawing Figures

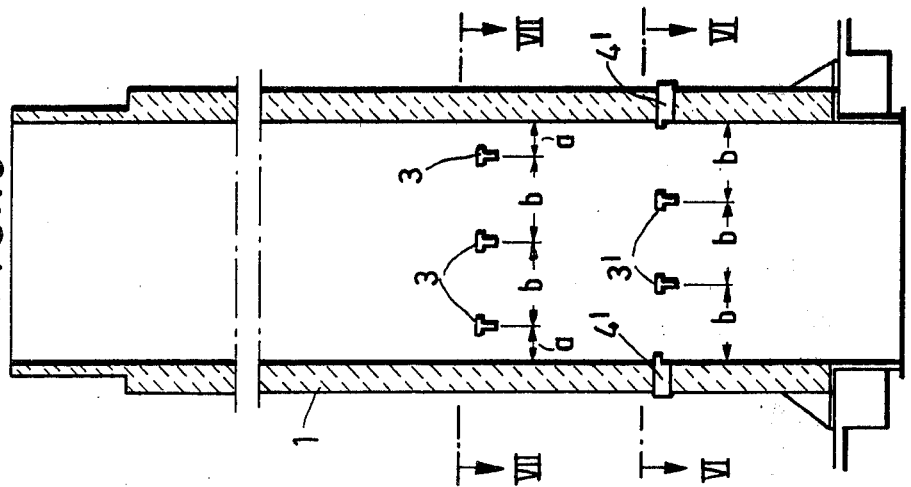
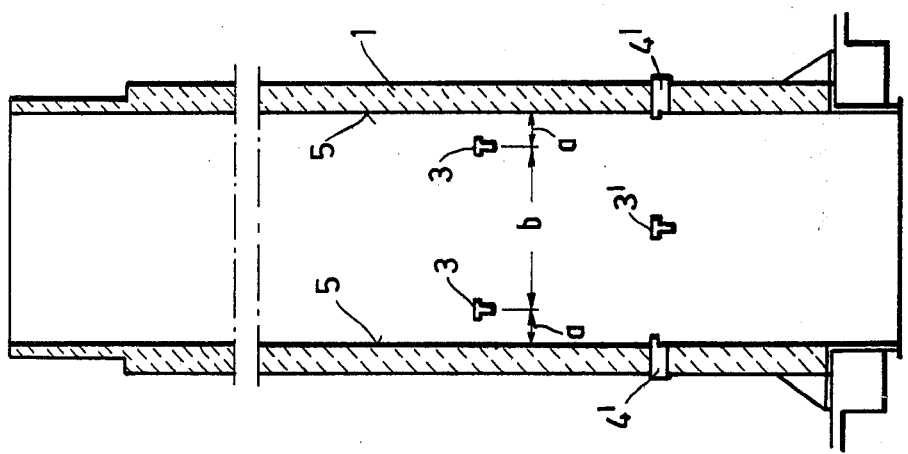
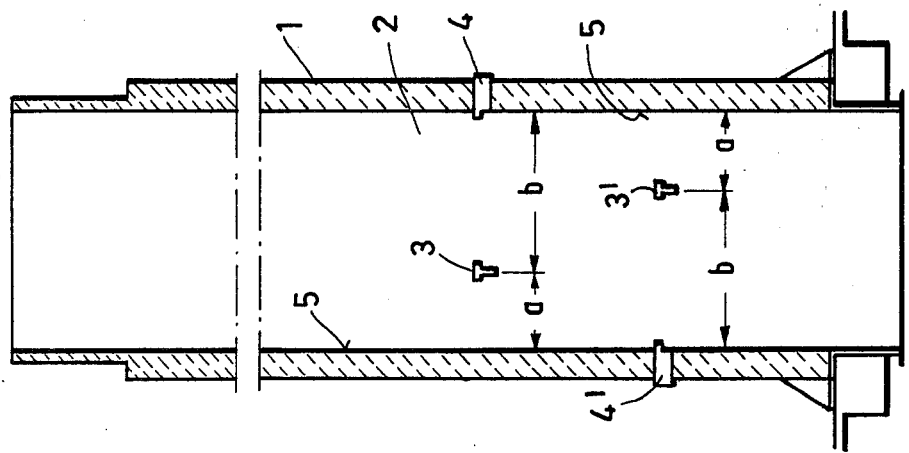

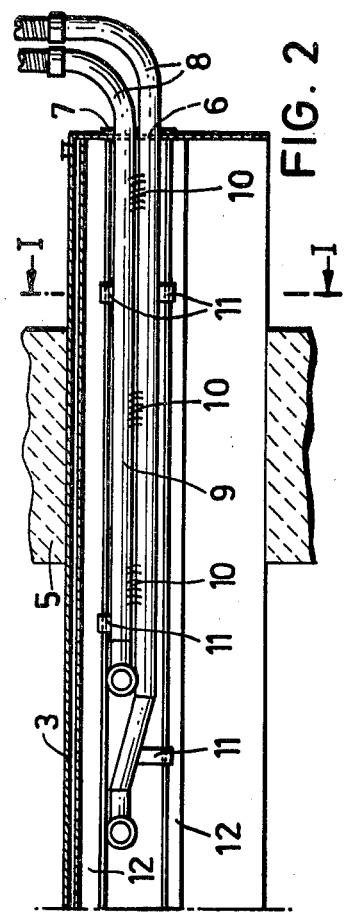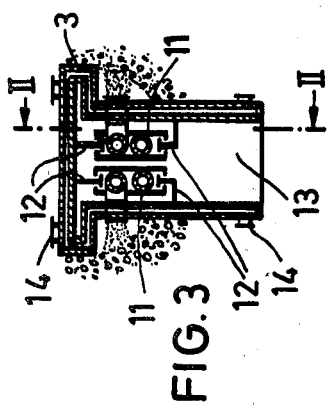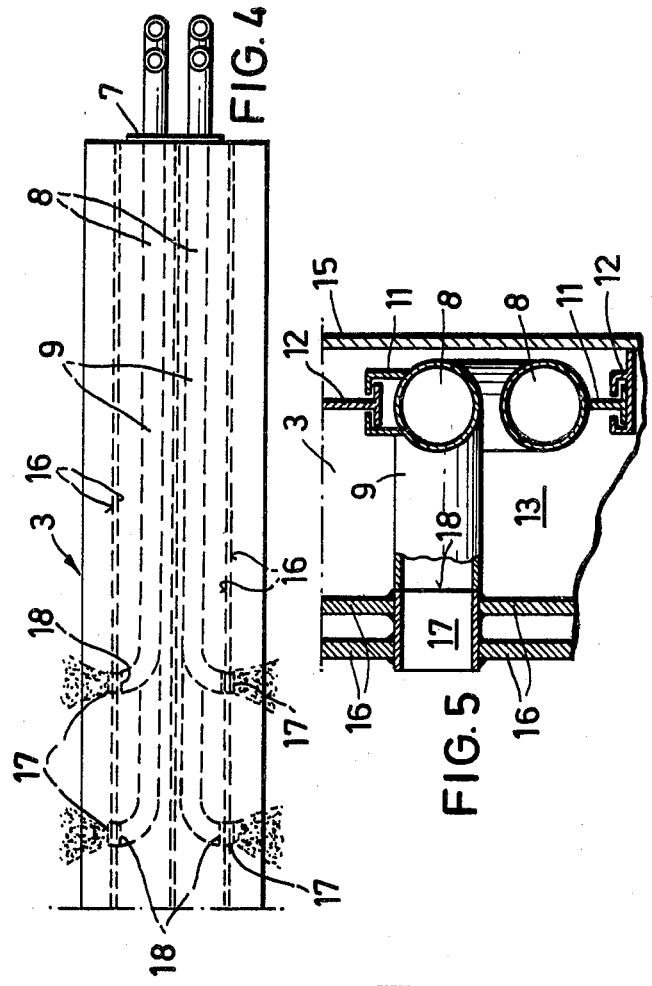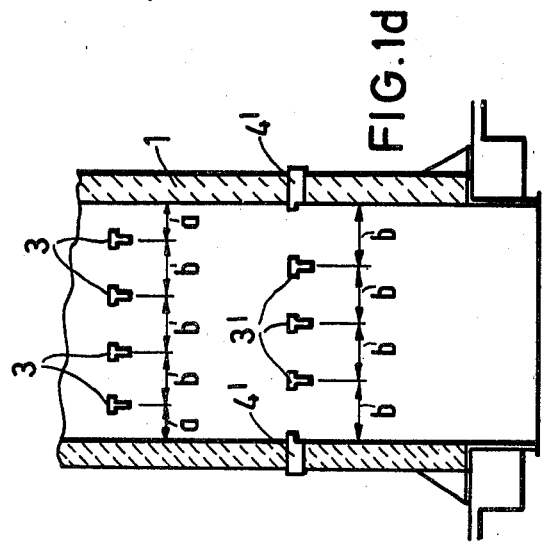

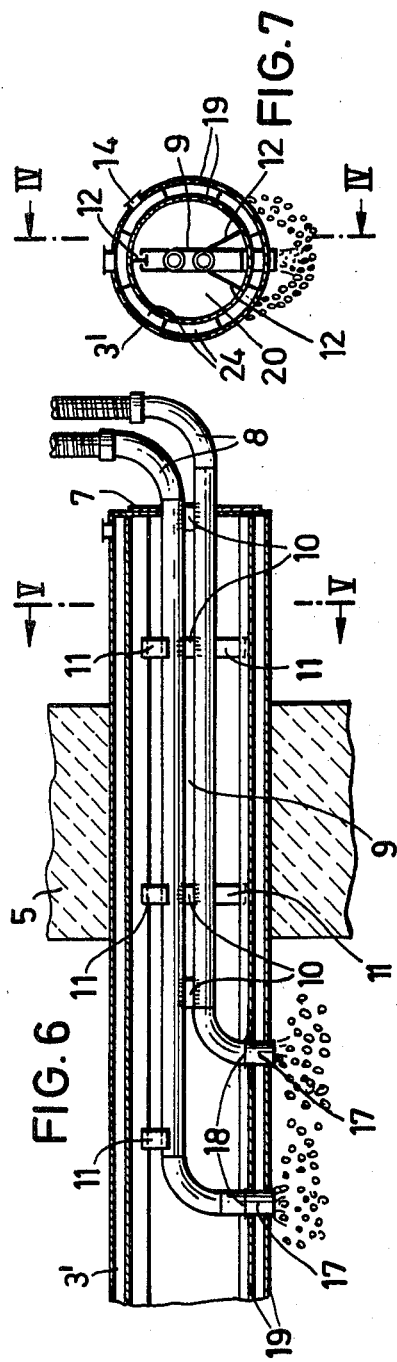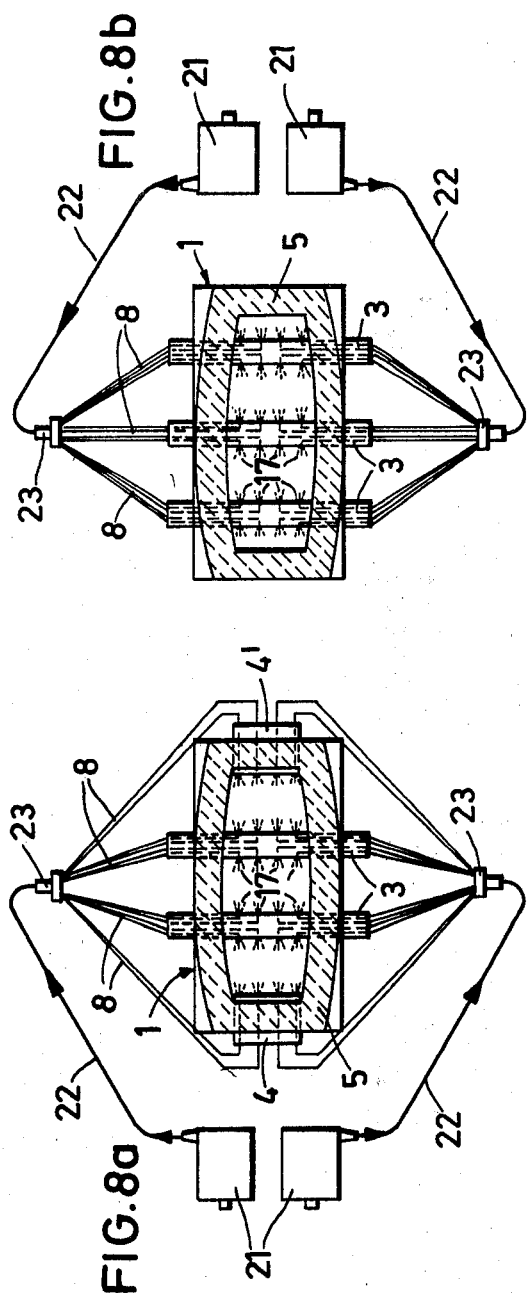

METHOD AND APPARATUS FOR CALCINING LIMESTONE IN A SHAFT KILN

BACKGROUND OF THE INVENTION

1. Field of the Invention

The present invention is in the field of shaft kiln assemblies and methods for operating the same and involves an improved apparatus for calcining limestone and the like wherein the apparatus contains a plurality of double walled hollow support means positioned at different vertical levels, and fuel conduits consisting of a bundle of individual pipes with guide means being provided internally of the hollow support means which position the fuel conduits in the appropriate location within the hollow interior of the shaft kiln.

2. Description of the Prior Art

Shaft kilns for calcining limestone and operating with liquid or gaseous fuels are known. Such kilns consist of a shaft which is provided at its top with devices for introducing the lime to be burned and for extracting the combustion gases. Discharge openings through which the cooled lime is withdrawn and through which air is introduced and preheated by means of contact with the product are situated in the floor of the calcining kiln. Hollow supports which contain lines having openings therein for the uniform distribution of liquid or gaseous fuel throughout the calcining zone are located in the calcining zone of the shaft kiln. The hollow supports are so constructed that complete combustion of the fuel occurs in a plurality of stages, and uniform distribution of the combustion heat in the entire calcining zone is obtained. The hollow supports may be equipped with cooling chambers for conducting a cooling fluid and a temperature control means may be provided which controls the kiln temperature according to changes in temperature of the cooling fluid. Such a device is shown in German AS No. 1,156,694 (U.S. Pat. No. 2,933,297).

The known shaft kilns depend exclusively on the employment of gaseous, liquid, or in some cases powdery fuels. Particularly in the case of powdery fuels, localized, undesired temperaure peaks and overburning may occur which are attributed to a too rapid burnout of the coal dust.

Coal dust as defined herein consists of material having particle sizes from the submicron range up to 500 microns.

It has also been known for a long time to calcine limestone in low shaft kilns with fuel in the form of lumps, employing a mixture of limestone and lump coal as the feed. However, these earlier methods face the problem that due to demixing of the feed material and the well-known phenomenon of channelling gas paths over zones of lower resistance, a non-uniform burning within the kiln cross section resulted in the simultaneous production of overburned and underburned material. This phenomenon becomes a serious problem particularly with larger kiln dimensions.

SUMMARY OF THE INVENTION

The present invention seeks to provide an improved method and apparatus for calcining minerals, particularly limestone, in a shaft kiln which contains a plurality of cooled hollow supports at at least two vertical levels, the hollow supports being provided with openings for the introduction of fuel into the inside space of the shaft kiln. In particular, one of the features of the present invention involves using granular coal instead of powdered coal, granular coal being defined as that material which has a grain size of from 500 microns up to 30 mm.

Suprisingly, it has been shown that the use of granular coal in the stated grain size range results in soft burning properties which were only occasionally achieved in the practice of the prior art. Furthermore, the use of the granular coal makes it possible to achieve unexpectedly favorable distribution properties heretofore achieved only in the use of liquid, gaseous or powdery fuels. There is also the advantage that there is a longer afterburning phenomenon which prevents localized overburning and undesired temperature excesses. This is particularly true in the case where the granular coal has a size range from 1 mm to 30 mm.

Particularly improved results are achieved when the grain size range of the granular coal amounts to 1 to 6 mm. This grain size is advantageous because it occurs in the grating of the coal washing and it can be achieved during mining by means of comminution in an economically favorable manner by means of impact comminution or by means of standard crushing methods.

To effect a distribution of the granular coal as uniformly as possible over the cross section of the shaft, the method of the present invention provides for the introduction of such granular coal through a multitude of locations spaced as uniformly as possible over the cross section of the kiln shaft. In particular, we prefer to supply the coal at a rate sufficient to provide a thermal input of from 100,000 to 200,000 kcal/hr for each introduction site, and preferably 125,000 through 175,000 kcal/hr. With this quantity of thermal input, a localized overburning is avoided and a sufficiently high availability of thermal energy is achieved in each level of the kiln. By the employment of coal grades whose calorific value lies, for example, between 6,000 and 7,000 kcal/kg, this corresponds to an introduction of about 20 and 30 kg/hr for each location.

The most favorable distribution of the granular coal fuel occurs when the granular coal is conveyed to the openings in the inside of the kiln by means of conveying air. The conveying air which enters into the inside of the shaft kiln from the lines together with the fuel represents the primary air. For the calcining process which is to be carried out as a soft burning process and as uniformly as possible, a very favorable ratio of primary air to secondary air is achieved when the conveying air makes up approximately 15 through 35% of the amount of combustion air required overall. Preferably, the amount of conveying air can also be set in such a manner that it makes up approximately 20 to 25% of the amount of overall air required.

In the case that the fuel is supplied to the shaft kiln at two vertically spaced levels lying one above the other, about 55 to 75% of the overall amount of fuel is introduced into the upper level and 25 to 45% of the overall fuel amount is introduced into the lower level.

The apparatus used in accordance with the present invention has hollow supports in which the inside spaces are accessible from outside the kiln walls and provide passages for the support of fuel lines which are parallel to the axis. The discharge orifices of the fuel lines are approximately at right angles to the lateral walls of the hollow supports and, in operative position, overlap with the discharge nozzles and have identical cross sections therewith. The discharge nozzles discharge into the inside of the kiln and penetrate through the double walls of the hollow supports which are supplied with a circulating cooling agent.

The fuel lines can be introduced into and withdrawn from the inside spaces of the hollow support by means of guide means in a manner similar to pulling out drawers without a significant amount of assembly work, in fact, without interrupting the calcining process. Due to the uncomplicated, improved overlapping between the discharge orifice of the fuel lines and the discharge nozzle, the introduction of coal into the inside of the kiln proceeds in a very uncomplicated manner.

A further embodiment consists in connecting together a plurality of individual fuel pipes as a unit for at least one-half of the length of the hollow support thereby providing an insert which is slidably received within additional support means in the hollow support and locked in position by means of a depth lock which closes the hollow support from the outside. This form of the invention serves to further simplify the manipulation required in the introduction and removal of the fuel lines, as well as facilitating repair of the inside spaces of the hollow support which is also possible during the calcining process.

The orifices of the fuel lines and the discharge nozzles into which they feed may overlap coaxially in a horizontal axial alignment. This alignment promotes the distribution of the granular coal at the level of introduction making it as uniform as possible.

The present apparatus may also include at least one metering device for granular coal and its carrier air, the device supplying a plurality of coal lines with granular coal and carrier air through a distributor unit. Both the metering device as well as the distributor unit are well-known commercially available devices which are not of themselves the subject matter of the invention but which in conjunction with the inventive devices are cooperating parts of the overall functioning unit.

In a preferred form of the present invention, the hollow support through which the coolant is circulated is formed of double walls and exhibits the shape of a box profile which has an open bottom. This shape is desirable because entrainment of coal dust by the granular coal at the junction between the fuel lines and the discharge nozzles cannot be avoided. When the hollow support has the shape of a box profile open toward the bottom, a deposit of coal dust in the inner space is avoided. Moreover, thermal irradiation from below is reduced since this is largely absorbed by the fuel lines.

In another form of the invention, the discharge nozzles exhibit a slightly larger diameter than the orifices of the fuel lines. For example, the inside diameter of the fuel lines may be 40 mm, with an outside diameter of 50 mm, in which case the inside diameter of the discharge nozzle may be 45 mm and the outside diameter 55 mm. The unavoidable overlap which can occur due to manufacturing tolerances or thermal expansion differences are compensated by such slight differences in diameter.

BRIEF DESCRIPTION OF THE DRAWINGS

The attached sheets of drawings illustrate several embodiments of the present invention, in which:

FIGS. 1a through 1d are schematic illustrations of various sized furnaces (drawn to different scales) showing the different dispositions of the hollow supports therein;

FIG. 2 is a fragmentary cross-sectional view illustrating the interior of a hollow support taken along the line II—II of FIG. 3;

FIG. 3 is a cross-sectional view taken substantially along the line I—I of FIG. 2;

FIG. 4 is a plan view of the hollow support shown in FIG. 2;

FIG. 5 is an enlarged cross-sectional view illustrating a portion of the hollow support shown in FIGS. 2 to 4 on an enlarged scale;

FIG. 6 is a view partly in cross section illustrating another form of the hollow support structure and fuel lines which can be used, said view being taken along the line IV—IV of FIG. 7;

FIG. 7 is a cross-sectional view through the hollow carrier with the fuel lines taken along the line V—V of FIG. 6; and FIGS. 8a and 8b are respectively cross-sectional views through the kiln shaft along the section line VI—VI and VII—VII of FIG. 1c.

DESCRIPTION OF THE PREFERRED EMBODIMENTS

FIG. 1a shows a shaft kiln 1 according to the present invention, and having a capacity of approximately 75 metric tons per day. It includes a shaft 2 in which there is located a hollow support 3. A line support 4 is provided at the wall side for accepting fuel lines at the upper level. A further hollow support 3' as well as a line support 4' close to the wall are disposed at a lower level. In the illustrated shaft kiln 1 of FIG. 1a, the dimensions are selected such that the distance a of the hollow support 3 or 3' from the wall 5 of the shaft kiln 1 is approximately 700 mm, whereas the distance b amounts to approximately 1200 mm.

In FIG. 1b, the shaft kiln 1 is designed for a capacity of approximately 100 metric tons per day and exhibits two hollow supports 3 at an upper level, with the spacing a of the hollow supports from the inside wall 5 of the shaft kiln 1 likewise being about 700 mm, and the opposite spacing b amounting to approximately 1400 mm. A hollow support 3' with two line supports 4' close to the wall are disposed at a lower level.

The shaft kiln according to FIG. 1c is designed for a throughput of 150 to 250 tons per day and exhibits three hollow supports 3 at an upper level, and two hollow supports 3' and two line supports 4' close to the wall at a lower level. With this arrangement, the dimensions are selected such that the distances a amount to approximately 700 mm and the distances b are approximately 1400 mm. Similar dimensions are used at the lower level.

The shaft kiln according to FIG. 1d is designed for a throughput of approximately 300 metric tons per day and has four hollow supports 3 at an upper level and three hollow supports 3' and two line supports 4' close to the wall at a lower level. The distances a and b are likewise approximately 700 and 1400 mm. The vertical spacings of the two levels are approximately identical and range in a magnitude of approximately 3000 mm.

The half hollow support 3 illustrated in cross section in FIG. 2 extends through the wall 5 of the shaft kiln and has an opening 6 at its outer side. The opening is closed by means of a depth stop 7 which consists of a plate rigidly welded to fuel lines 8 and serves the function of limiting the depth of insertion of the fuel lines 8. The lines 8 consist of a bundle of individual fuel pipes combined into a rigid pipe bundle designated at reference numeral 9, the pipes being welded together, for example, at weldments 10. The pipe inserts are equipped with guides 11 enabling the rigid pipe bundle to be moved in an axial direction in channels 12 which are rigidly disposed in the inside space 13 of the hollow support 3. It will be seen from the longitudinal section of the hollow support in FIG. 2 as well as from the enlarged detail of FIG. 5 that the fuel lines 8 in the form of a rigid pipe bundle are easily and very exactly positioned for axial movement in the channels 12. It can be further seen from FIG. 3 that the hollow support 3 is double walled, and provided with connections 14 for the flow of a coolant between the double walls.

In a preferred embodiment of the invention, the hollow support 3 as seen from FIG. 3 has the shape of a box-shaped profile in the form of a T, whose inside space 13 opens toward the bottom.

FIG. 5 shows a particularly preferred form of the invention. As seen in that Figure, discharge nozzles 17 are rigidly welded into the double walls 16 of the hollow support 3, the discharge of the longitudinally supported lines 18 essentially coinciding axially with the discharge nozzles 17 in abutting relation. From this arrangement, made possible by the configuration of the pipes as well as the depth stop 7, the insertion or removal of pipe lines 8 is facilitated to an unusual degree and thus provides an extremely advantageous structure for operation, repair, and replacement in case of wear.

It will be seen from FIG. 4, which is a plan view of the hollow support 3 shown in FIG. 2, that the orifices 18 of the fuel lines are positioned at approximately right angles relative to the lateral walls 16 of the hollow support 3 and cooperate with the discharge nozzles 17 as aforesaid.

The arrangements shown in FIGS. 6 and 7 includes hollow supports 3' which differ from the hollow supports 3 shown in FIGS. 2 and 3 insofar as the hollow supports 3' consist of concentric pipes 19 which define coaxial coolant chambers 24. The double pipes 19 provide an inside space 20 which is not open toward the bottom. The inside space 20 is closed at its end face by means of a depth stop 7 as soon as the fuel lines 8 which form a self-contained bundle identified at reference numeral 9, are inserted into their working position. In this position, the orifices 18 of the pipe lines 8 overlap the discharge nozzles 17 with equal cross section, and discharge nozzles 17 penetrate the double walls 19 and are rigidly secured and tightly welded thereto.

Cross-sectional views through the kiln shaft are shown in FIGS. 8a and 8b. These Figures illustrate inclusion of metering devices 21 which provide a specific amount of conveying air in the manner of known pneumatic conveying devices, generating the conveying air with a pressure level matched to the length of the pipe line and to the individual resistances. The metering devices 21 add a stoichiometrically apportioned amount of granular coal to the conveying air in a metered manner. The pneumatically conveyed mixture consisting of granular coal and conveying air is conducted through lines 22 to distributors 23 which uniformly distribute the air/fuel mixture to the fuel lines 8. As the illustrations of FIGS. 8a and 8b further show, the hollow supports 3 extend through the shaft walls 5 of the shaft kilns 1 and further, the built-in position of the line supports 4, 4' in proximity to the wall can also be seen. These Figures also show the uniform distribution of the discharge nozzles 17 in the cross section of a shaft kiln 1. The discharge nozzles are preferably spaced from a kiln wall by a spacing of from 500 to 850 mm, with the spacing between the discharge nozzles in the direction of the longitudinal axes of the hollow support means being from 250 to 500 mm. The axial distance between two confronting discharge outlets is in the range from 1000 to 1500 mm.

In the illustrated form of the invention, approximately five discharge nozzles 17 are arranged in uniform distribution for each square meter of kiln cross-sectional surface, thereby guaranteeing a uniformly soft but nonetheless intensive burning of the material to be calcined over the entire cross section of the kiln without the employment of gaseous, liquid or pulverized coal.

It should be evident that various modifications can be made to the described embodiments without departing from the scope of the present invention.

We claim as our invention:

1. An apparatus for calcining minerals such as limestone comprising in combination:
   a vertical shaft kiln with a calcining chamber therein;
   a plurality of horizontally extending hollow support means being double walled for the flow of coolant between the double walls and positioned at different levels in said calcining chamber, the inside space within the support being closed in an upward direction;
   fuel conduits each including a plurality of solid fuel pipes in parallel relationship extending from outside said kiln into said support means space within each of the support means;
   guide means extending longitudinally within said support means and parallel thereto supporting said conduits so that the fuel pipes can be slid therealong;
   spaced discharge openings from said pipes along said conduits; said conduit means being positionally adjustable along said guide means so that the location of said openings can be changed relative to the kiln with movement of said conduit means along said guide means for uniform distribution of fuel across the chamber;
   means for delivering granular fuel to said conduit for a soft burning process within the kiln;
   and means fo circulating coolant between the double walls of said support means.

2. An apparatus for calcining minerals such as limestone constructed in accordance with claim 1:
   including a depth stop attached to said fuel pipes for engagement with an outer wall of the kiln and limiting the depth of insertion of the conduits into the kiln.

3. An apparatus for calcining minerals such as limestone constructed in accordance with claim 1:
   wherein said solid fuel pipes are welded to each other.

4. An apparatus for calcining minerals such as limestone constructed in accordance with claim 1:
   wherein the hollow support means is T-shaped and has a downwardly facing opening.

5. An apparatus for calcining minerals such as limestone constructed in accordance with claim 1:
   wherein nozzles are located in said support means for alignment with said discharge openings for distribution of granular solid fuel into the kiln chamber for a soft burning process.

6. The method of calcining materials such as limestone in a shaft kiln comprising the steps:
   introducing coal in a grain size ranging from a grain size from 1 to 6 mm at vertically spaced different levels through nozzles laterally separated at each level;

and obtaining uniform distribution for a soft burning process within the kiln by adjusting the lateral location of nozzles independently at each level for uniform distribution through the kiln.

7. The method of calcining materials such as limestone in a shaft kiln in accordance with the steps of claim 6:

and introducing the granular coal at a rate sufficient to provide a thermal input of 100,000 to 200,000 kcal/hr for each introduction site.

8. The method of calcining materials such as limestone in a shaft kiln in accordance with the steps of claim 6:

wherein said granular coal is conveyed into said kiln in the conveying airstream.

9. The method of calcining materials such as limestone in a shaft kiln in accordance with the steps of claim 6:

wherein 55% to 75% of the coal is introduced at the upper portion of the kiln and the remaining 25% to 45% of the fuel is introduced at a lower portion of the kiln.

* * * * *